(12) United States Patent
Xie (10) Patent No.: US 11,608,935 B2
(45) Date of Patent: Mar. 21, 2023

(54) METAL ROOF MOUNTING BRACKETS

(71) Applicant: Jason Sen Xie, Fremont, CA (US)

(72) Inventor: Jason Sen Xie, Fremont, CA (US)

( * ) Notice: Subject to any disclaimer, the term of this patent is extended or adjusted under 35 U.S.C. 154(b) by 0 days.

(21) Appl. No.: 17/561,852

(22) Filed: Dec. 24, 2021

(65) Prior Publication Data
US 2022/0112980 A1 Apr. 14, 2022

Related U.S. Application Data

(62) Division of application No. 16/804,123, filed on Feb. 28, 2020, now Pat. No. 11,408,555.

(60) Provisional application No. 62/813,040, filed on Mar. 3, 2019.

(51) Int. Cl.
*F16M 13/02* (2006.01)
*E04D 3/30* (2006.01)

(52) U.S. Cl.
CPC ............... *F16M 13/02* (2013.01); *E04D 3/30* (2013.01)

(58) Field of Classification Search
USPC ............ 248/222.14, 220.21, 220.22, 222.13, 248/223.51, 223.41, 224.8, 223.21, 248/225.11, 229.2, 229.24, 226.11, 227.2, 248/228.5, 231.61, 316.6; 52/528, 582.1, 52/584.1, 520, 521, 465–567, 698, 713
See application file for complete search history.

(56) References Cited

U.S. PATENT DOCUMENTS

| | | | | |
|---|---|---|---|---|
| 5,822,918 A * | 10/1998 | Helfman | ................ | A47G 7/044 248/231.41 |
| 5,984,249 A * | 11/1999 | Cohen | ................... | A47G 7/044 248/205.2 |
| 7,243,449 B2 * | 7/2007 | Wichmann | ................ | G09F 7/18 40/606.01 |
| 7,735,800 B2 * | 6/2010 | Lunato | ................... | A47G 7/044 47/68 |
| 8,561,355 B2 * | 10/2013 | Canavarro | ............ | E04B 2/7416 52/27 |
| 2005/0045785 A1 * | 3/2005 | Cohen | ................. | E04F 11/1812 248/228.3 |
| 2005/0284995 A1 * | 12/2005 | Hutter, III | ............ | F16B 37/044 248/235 |
| 2007/0262219 A1 * | 11/2007 | Hutter, III | ............... | B64C 1/406 248/229.1 |
| 2018/0002936 A1 * | 1/2018 | Murphy | .................... | F16B 2/22 |
| 2018/0245356 A1 * | 8/2018 | Muth | ................... | A47B 96/027 |

* cited by examiner

*Primary Examiner* — Alfred J Wujciak
(74) *Attorney, Agent, or Firm* — Douglas L. Weller (57) ABSTRACT

A width adjustable bracket for a metal roof includes a bolt, a top bracket and a bottom bracket. The top bracket has a flat surface with a slot for receiving the bolt. The flat surface is sized to receive an L bracket. A bottom bracket has a flat portion with a threaded hole for receiving the bolt. The width adjustable bracket is assembled by placing the bolt though the slot of the top bracket and the bolt being secured to the threaded hole of the bottom bracket. Once the bolt is placed through the top bracket, and placed in the threaded hole of the bottom bracket, the slot in the top bracket allows adjustment of a width of the width-adjustable bracket until the bolt is tightened into the threaded hole of the bottom bracket.

3 Claims, 9 Drawing Sheets

METAL ROOF MOUNTING BRACKETS

BACKGROUND

For solar photovoltaic installation, snow guard installation and other applications on corrugated and R-panel trapezoidal metal roofs, the most common roof attachments used to secure a solar mounting system or a snow guard system are a variety of mounting brackets with different shapes. Each mounting bracket is secured to the metal roof. Another part is used to connect the mounting bracket to the rail for a solar mounting system or to a snow guard. When a bracket is installed on a corrugated or R-panel trapezoidal metal roof, the bracket must fit the profile of the metal roof in order to be secured on the roof with screws. Due to the various shapes and profiles of corrugated and R-panel trapezoidal metal roofs, it is difficult to find one such bracket that fits most of corrugated and R-panel trapezoidal metal roof profiles. Therefore, for each corrugated and R-panel trapezoidal metal roof profile, there is typically used a specific bracket that fits its profile. Universal brackets that fit several corrugated and R-panel trapezoidal metal roof profiles are typically expensive or complicated and not easy to use.

DETAILED DESCRIPTION

Herein is disclosed two types of brackets. One bracket is a universal angle-adjustable bracket that fits most of the common corrugated and R-panel trapezoidal metal roof profiles. A second bracket is a width-adjustable bracket that fits most of the common corrugated metal roof profiles. Each of these brackets can be adjusted to fit different metal roof profiles and secured to a metal roof with screws.

The angle-adjustable bracket has fours components: top platform, left bracket, right bracket and bottom nut. The left bracket and the right bracket can rotate to provide different angels to fit different corrugated and R-panel trapezoidal metal roof profiles. Once the left and right brackets are adjusted at the right angle, the four parts can be attached together with a bolt. Then the assembled and tightened bracket can fit the metal roof profile and be secured to the rib of metal roof with screws.

The width-adjustable bracket has two components: a top bracket with a slot for a bolt and a bottom bracket with a threaded bolt hole. The top and bottom brackets can adjust horizontally to provide different width to fit different corrugated metal roof profiles. Once the top and bottom brackets are adjusted at the right width, the two parts can be attached together with a bolt. Then the assembled and tightened bracket can fit on top of the rib of corrugated metal roof and be secured to the roof with screws.

Figure 1:
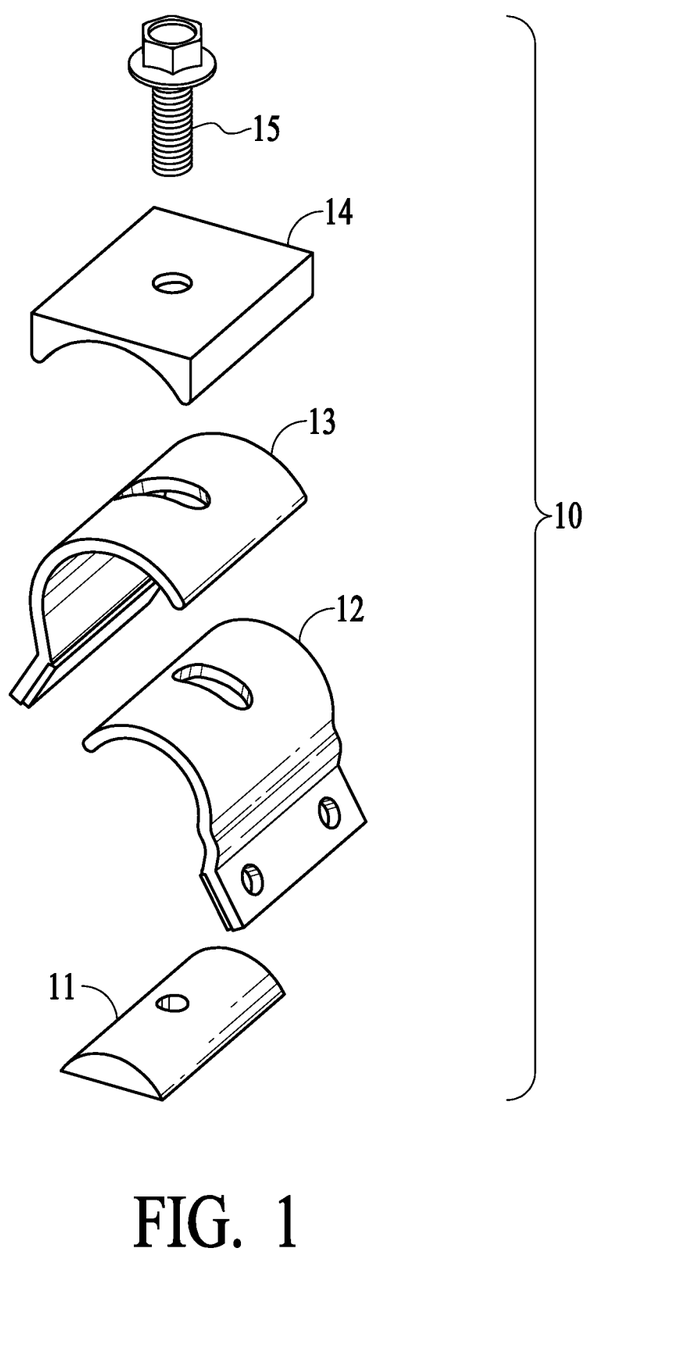
FIG. 1 is a perspective view of a universal angle-adjustable bracket for an R-panel trapezoidal metal roof before assembly.
Figure 2:
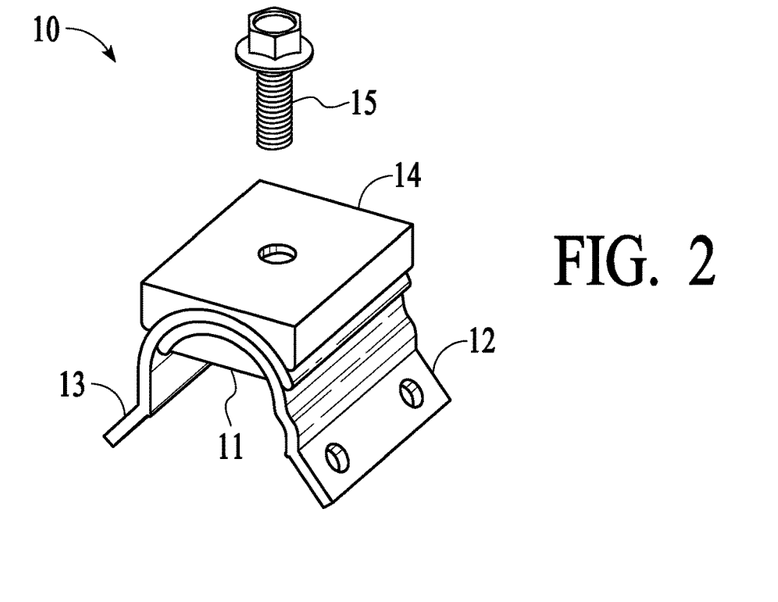
FIG. 2 is a perspective view of a universal angle-adjustable bracket for an R-panel trapezoidal metal roof after assembly.

FIG. 1 and FIG. 2, shown a universal angle-adjustable bracket 10 for an R-panel trapezoidal metal roof. For example, universal angle-adjustable bracket 10 for an R-panel trapezoidal metal roof includes a top platform 14, a left bracket 13, a right bracket 12 and a bottom nut 11. Top platform 14 provides a flat platform that can be used to attach additional component for solar mounting system, snow guard or other applications. Top platform 14 has a bolt hole, through which a flange bolt 15 comes through to connect the other three components of universal angle-adjustable bracket 10. Left bracket 13 and right bracket 12 can rotate to provide different angles to fit different R-panel trapezoidal metal roof profiles. This is accomplished by a curved portion in left bracket 13 that includes a slot and a curved portion in right bracket 12 that includes a slot. The slot in left bracket 13 and slot in right bracket 12 each receive flange bolt 15 and allow adjustment of the angles of universal angle-adjustable bracket 10 until bolt 15 is tightened.

Bottom nut 11 functions to secure flange bolt 15 after flange bolt 15 is placed through the bolt hole in top platform 14, the slot in left bracket 13 and the slot in right bracket 12. Once left bracket 13 and right bracket 12 are adjusted at appropriate angle, bottom nut 11 is used to tighten bolt 15 to top platform 14, left bracket 13 and right bracket 12 at the selected angle for attachment of universal angle-adjustable bracket 10 to the R-panel trapezoidal metal roof.

Figure 3:
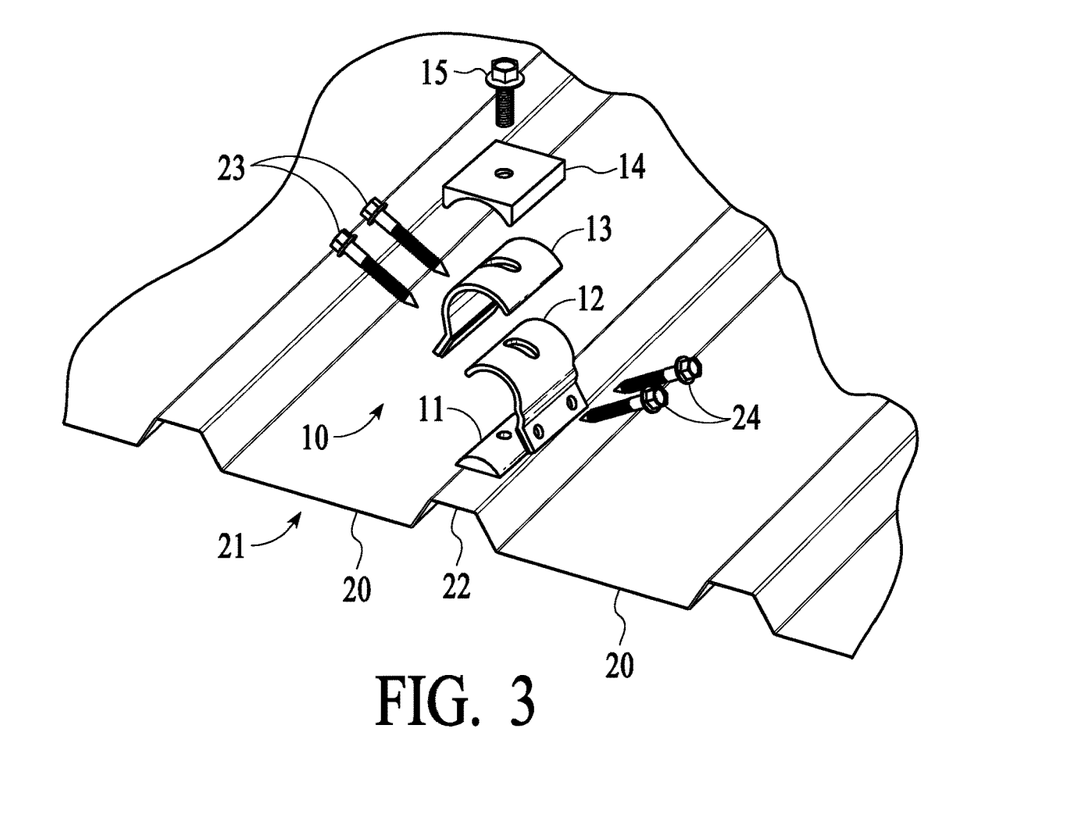
FIG. 3 is a perspective view of a universal angle-adjustable bracket for an R-panel trapezoidal metal roof on R-panel trapezoidal metal roof before assembly.
Figure 4:
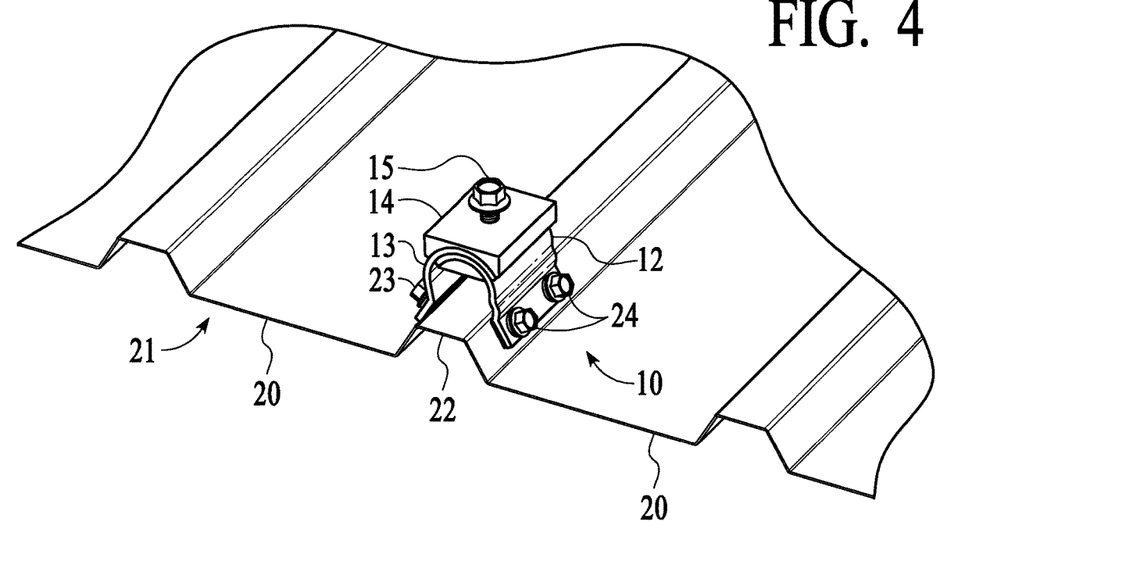
FIG. 4 is a perspective view of a universal angle-adjustable bracket for an R-panel trapezoidal metal roof on R-panel trapezoidal metal roof after assembly.

FIG. 3 and FIG. 4 show universal angle-adjustable bracket 10 for an R-panel trapezoidal metal roof is attached to a rib 22 between two panel sections 20 of an R-panel trapezoidal metal roof 21 using self-tapping screws 23 placed through holes in left bracket 13 and self-tapping screws 24 placed through holes in right bracket 12.

For example, once left bracket 13 and right bracket 12 are adjusted at an appropriate angle, the four parts can be attached together with bolt 15. The adjusted left and right brackets are attached to the rib of R-panel trapezoidal metal roof with self-tapping screws. Therefore the assembled and tightened brackets is secured to the rib of the R-panel trapezoidal roof. It provides a platform for solar installation, snow guard installation or other applications.

Figure 5:
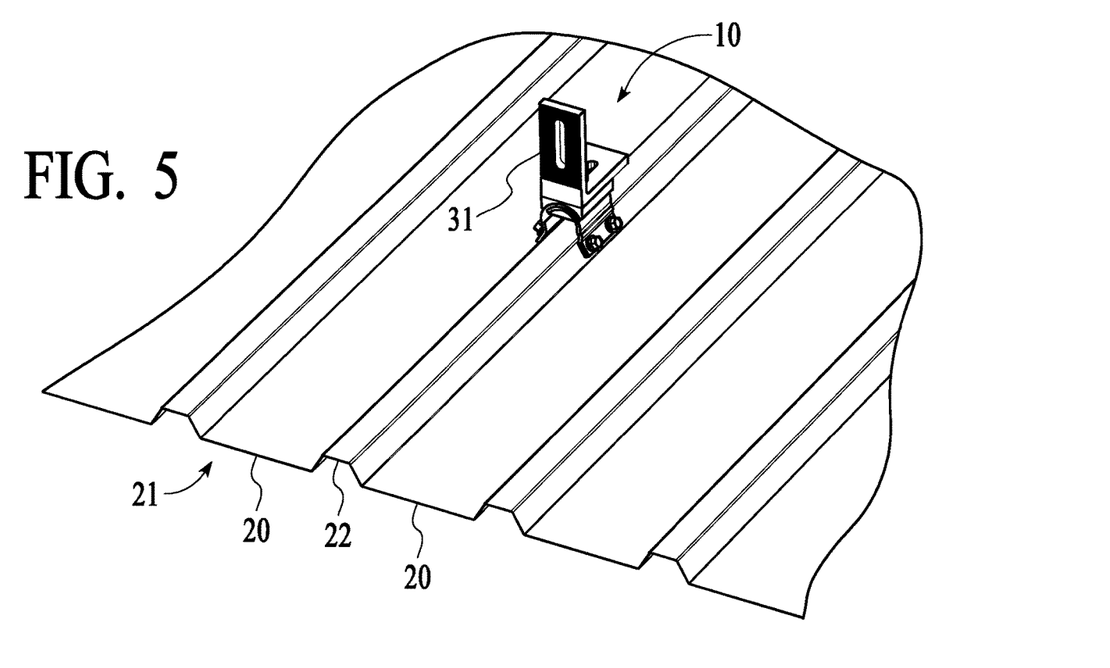
FIG. 5 is a perspective view of a universal angle-adjustable bracket with an L bracket for an R-panel trapezoidal metal roof on the R-panel trapezoidal metal roof after assembly.

FIG. 5 shows universal angle-adjustable bracket 10 with an L bracket 31 placed on R-panel trapezoidal metal roof 21.

For example, L bracket 31 can be attached to universal angle-adjustable bracket 10 using bolt 15 (shown in FIG. 4). L bracket 31 can be attached to rails (not shown) for a solar mounting system, for a snow guard or for other applications.

Figure 6:
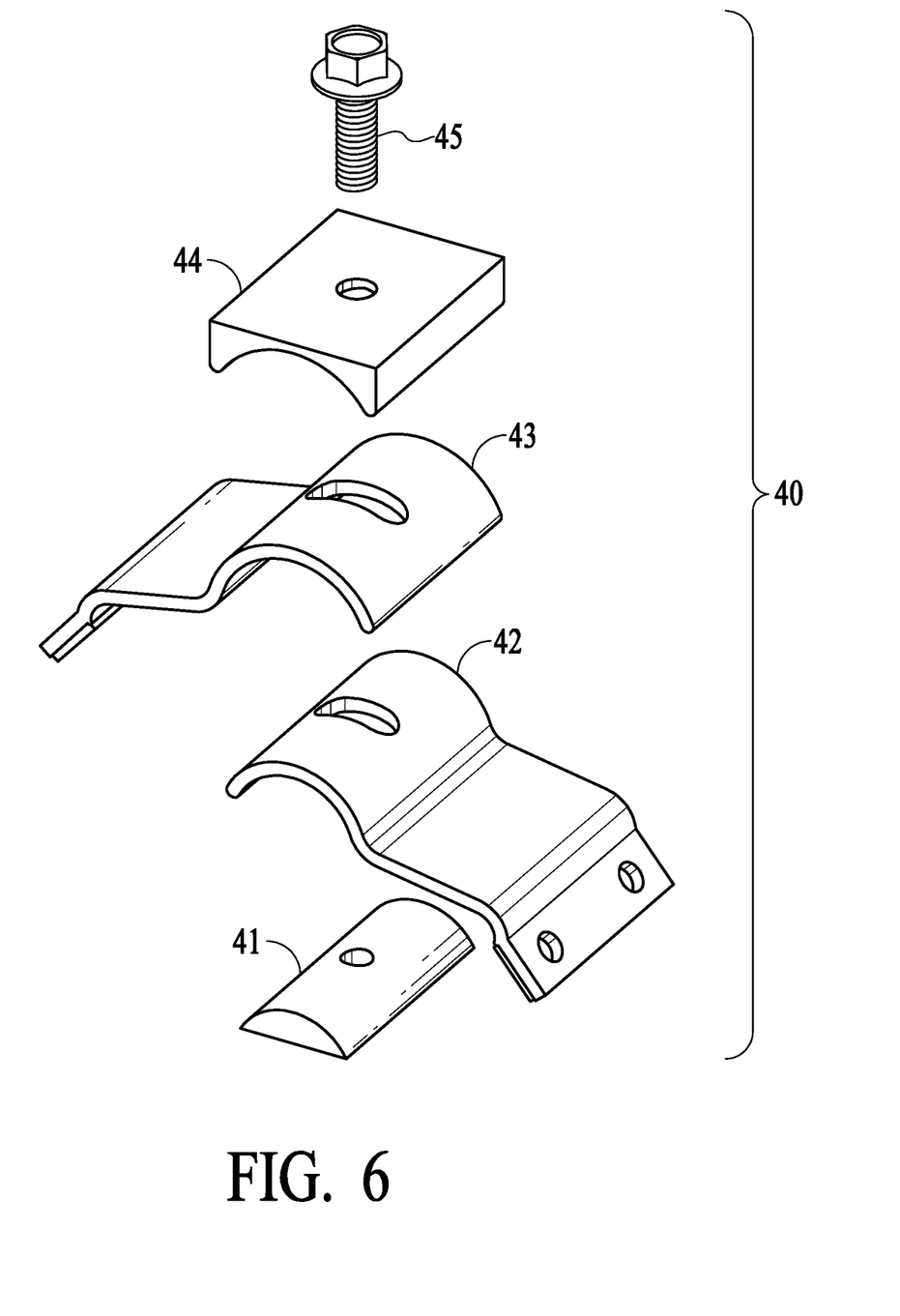
FIG. 6 is a perspective view of a universal angle-adjustable bracket for a corrugated metal roof before assembly.
Figure 7:
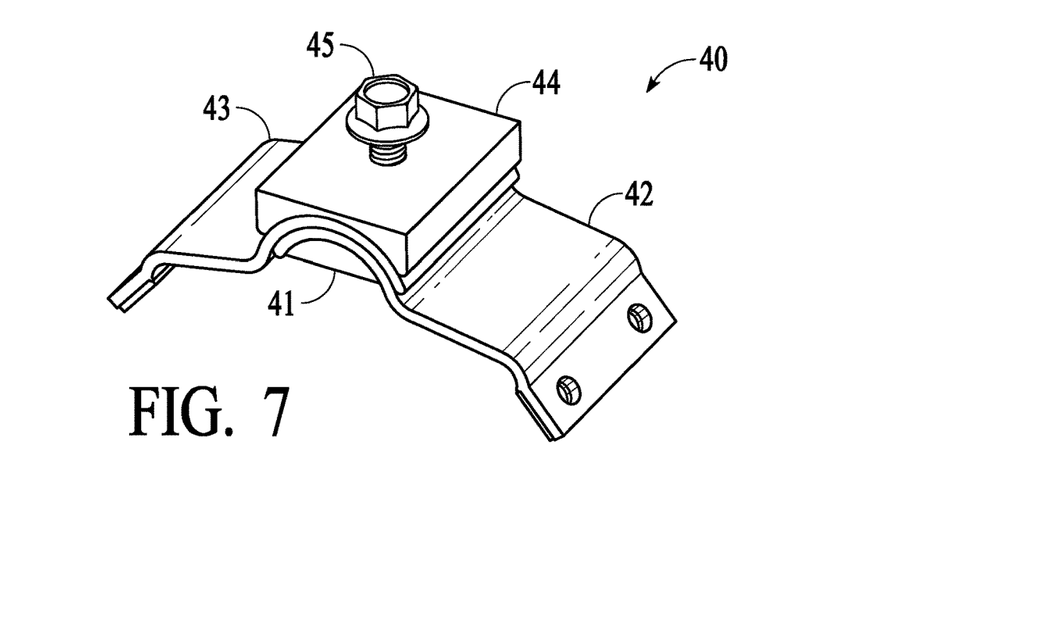
FIG. 7 is a perspective view of a universal angle-adjustable bracket for a corrugated metal roof after assembly.

FIG. 6 and FIG. 7 show a universal angle-adjustable bracket 40 for a corrugated metal roof. For example, universal angle-adjustable bracket 40 has four components: a top platform 44, a left bracket 43, a right bracket 42 and a bottom nut 41. The top platform 44 provides a flat platform that can be used to attach additional component for solar mounting system, snow guard or other applications. Top platform 44 has a bolt hole, through which a flange bolt 45 comes through to connect the other three components. Left bracket 43 and right bracket 42 can rotate to provide different angles to fit different corrugated metal roof profiles. This is accomplished by a curved portion in left bracket 43 that includes a slot and a curved portion in right bracket 42 that includes a slot. The slot in left bracket 43 and the slot in right bracket 42 each receive flange bolt 45 and allow adjustment of the angles of universal angle-adjustable bracket 40 until bolt 45 is tightened.

Bottom nut 41 functions as a nut to secure left bracket 43 and right bracket 42 to the top platform 44 with a bolt 45 tightened from the top platform 44. Once left bracket 43 and right bracket 42 are adjusted at appropriate angle, the four parts can be securely held together with bolt 45 and bottom nut 41.

Figure 8:
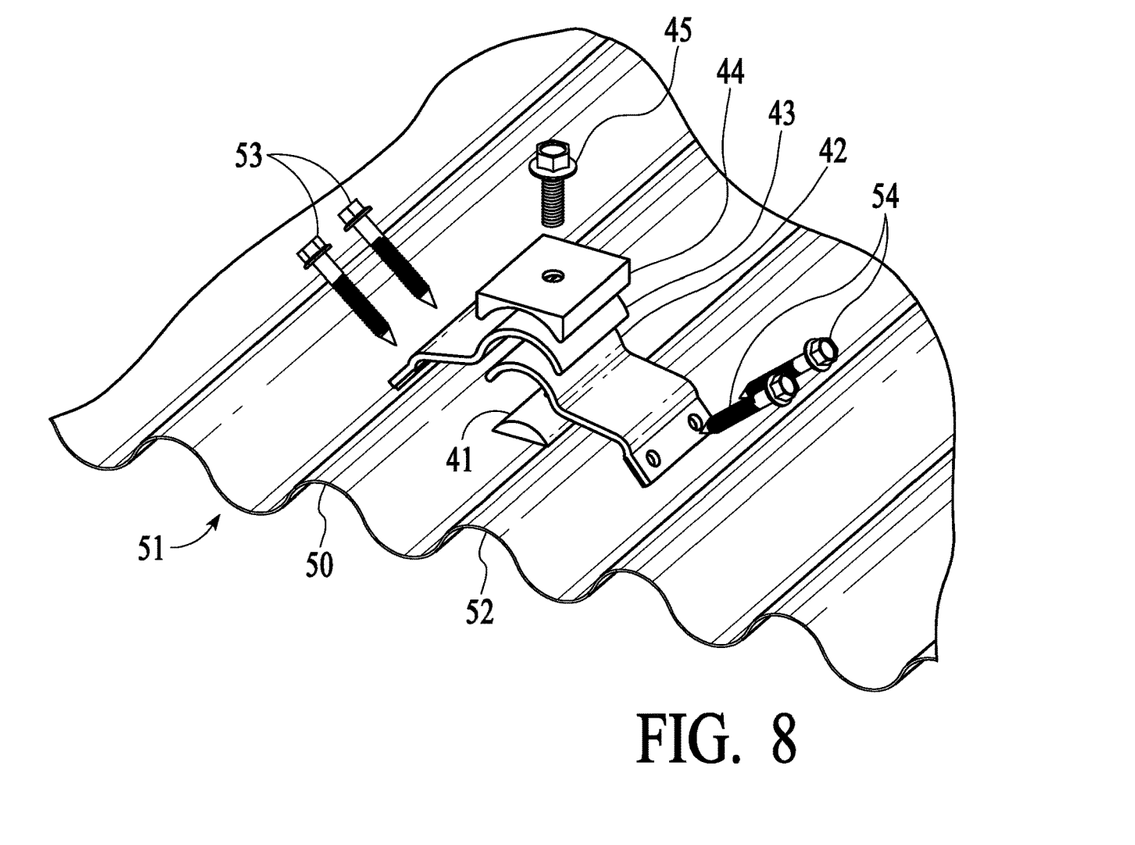
FIG. 8 is a perspective view of a universal angle-adjustable bracket for a corrugated metal roof on a corrugated metal roof before assembly.
Figure 9:
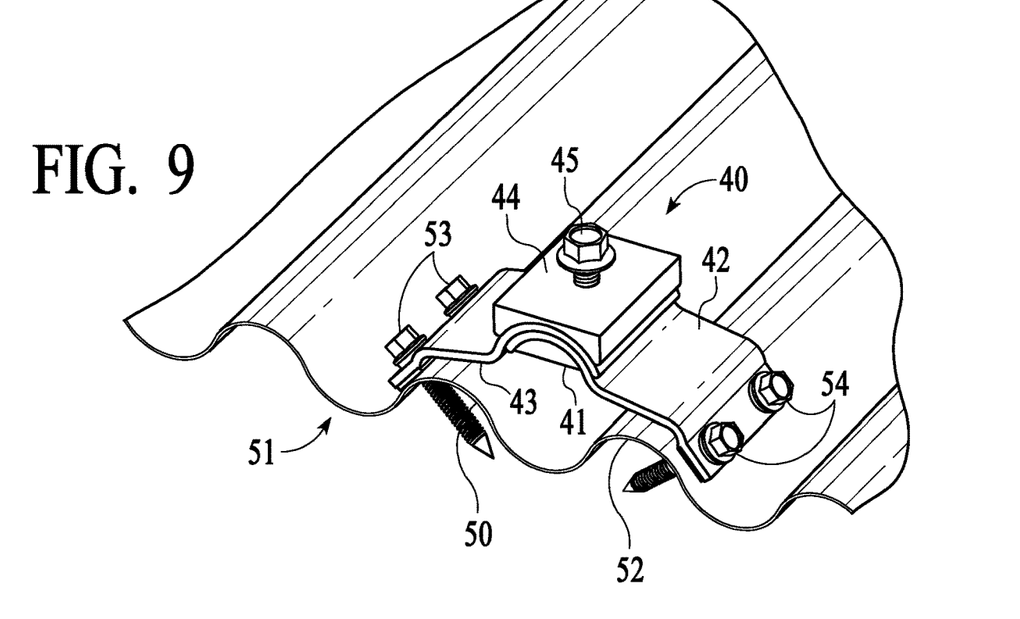
FIG. 9 is a perspective view of a universal angle-adjustable bracket for a corrugated metal roof on a corrugated metal roof after assembly.

FIG. 8 and FIG. 9 show universal angle-adjustable bracket 40 being attached to a rib 50 and a rib 52 of a corrugated metal roof 51 using self-tapping screws 53 and self-tapping screws 54.

For example, once left bracket 43 and right bracket 42 are adjusted at an appropriate angle, the four parts of universal angle-adjustable bracket 40 can be attached together with bolt 45. Once adjusted, left bracket 43 and right bracket 42 are attached to rib 50 and a rib 52 of a corrugated metal roof 51 using self-tapping screws 53 and self-tapping screws 54. The assembled and tightened universal angle-adjustable bracket 40 is secured to the rib 50 and a rib 52 of a corrugated metal roof 51. Universal angle-adjustable bracket 40 provides a platform for solar installation, for snow guard installation or for other applications.

Figure 10:
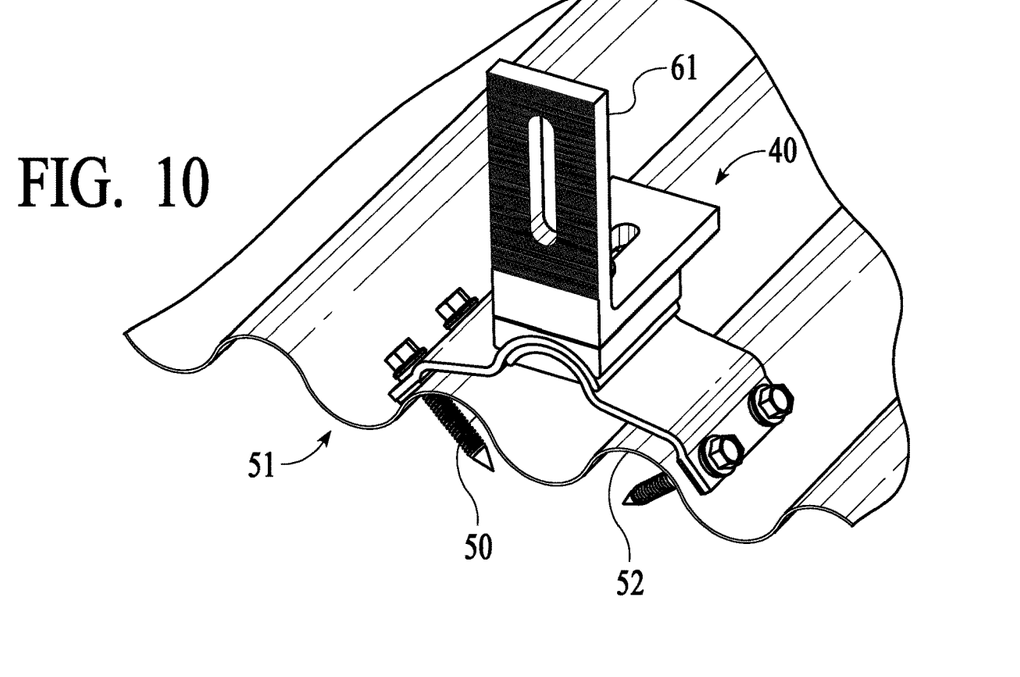
FIG. 10 is a perspective view of a universal angle-adjustable bracket with an L bracket for a corrugated metal roof on a corrugated metal roof after assembly.

FIG. 10 shows universal angle-adjustable bracket 40 with an L bracket 61 on corrugated metal roof 51. For example, L bracket 61 can be attached to universal angle-adjustable bracket 40 using the bolt 45 (shown in FIG. 9). L bracket 61 can be attached to rails for a solar mounting system, for a snow guard or for other applications.

Figure 11:
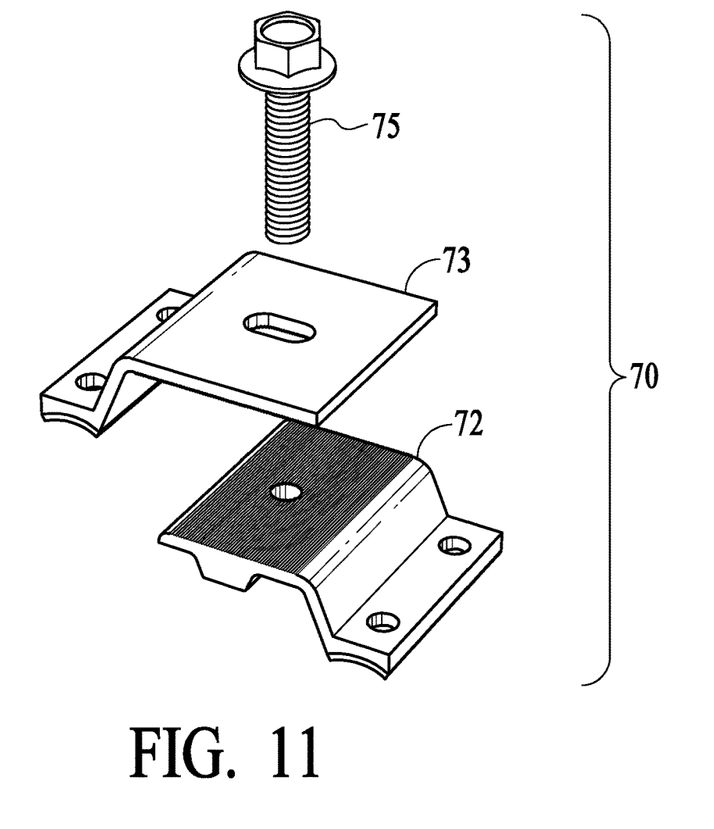
FIG. 11 is a perspective view of a universal width-adjustable bracket for a corrugated metal roof before assembly, the second present invention
Figure 12:
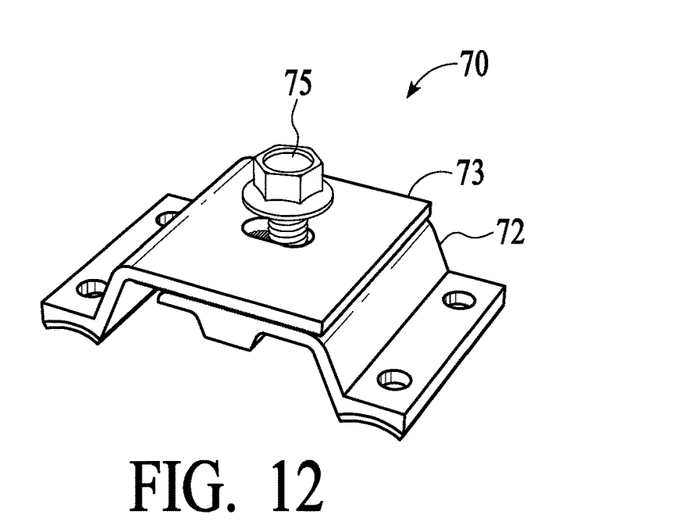
FIG. 12 is a perspective view of a universal width-adjustable bracket for a corrugated metal roof after assembly.

FIG. 11 and FIG. 12 show a universal width-adjustable bracket 70 for a corrugated metal roof. For example, universal width-adjustable bracket 70 has two components: a top bracket 73 and a bottom bracket 72. Top bracket 73 has a slot for a bolt 75. Bottom bracket 72 has a threaded bolt hole. Top bracket 73 provides a flat platform that can be used to attach additional components for a solar mounting system, for a snow guard and for other applications. Top bracket 73 has a slot for bolt 75, through which a flange bolt comes through. The bolt 75 slot allows top bracket 73 to adjust width horizontally to fit different corrugated metal roof profiles. Bottom bracket 72 can be attached with top bracket 73 using bolt 75 tightened from top bracket 73. Once the top bracket 73 and bottom bracket 72 are adjusted at the appropriate width, the two parts can be attached together with bolt 75.

Figure 13:
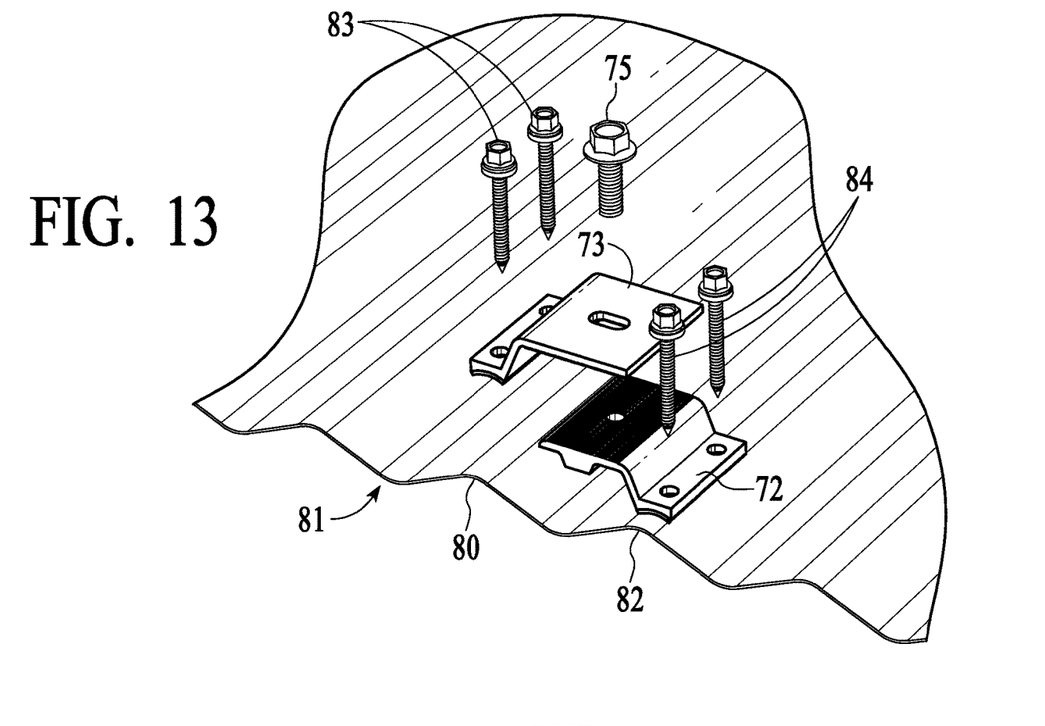
FIG. 13 is a perspective view of a universal width-adjustable bracket for a corrugated metal roof on a corrugated metal roof before assembly.
Figure 14:
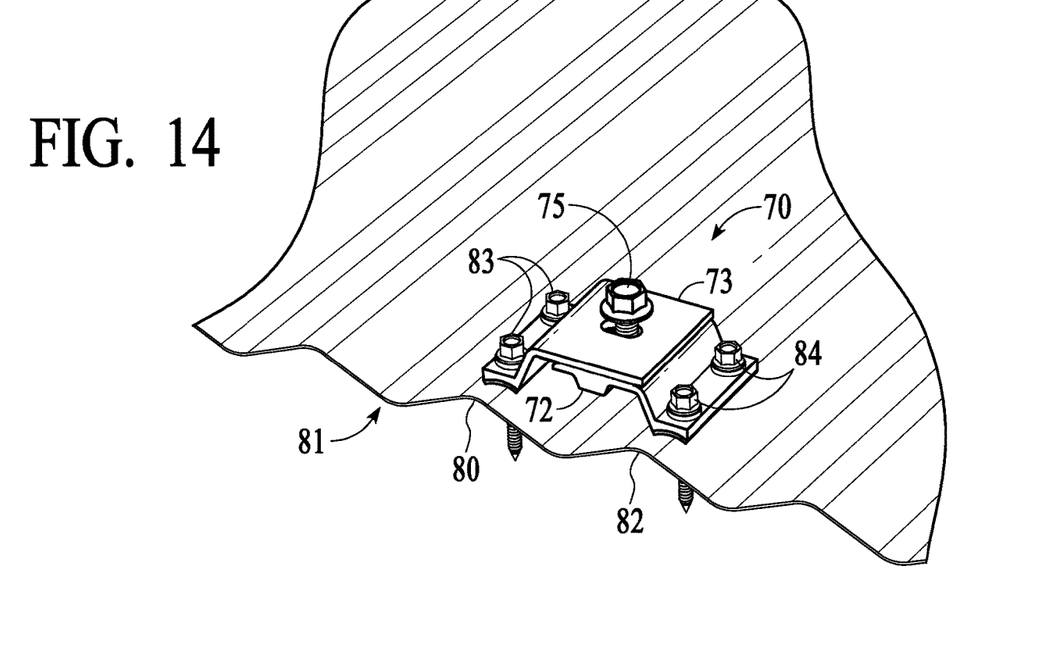
FIG. 14 is a perspective view of a universal width-adjustable bracket for a corrugated metal roof on a corrugated metal roof after assembly.

FIG. 13 and FIG. 14 shows universal width-adjustable bracket 70 attached to a ridge 80 and a ridge 82 of a corrugated metal roof 81 using self-tapping screws 83 and self-tapping screws 84.

For example, once top bracket 72 and bottom bracket 72 are adjusted at the appropriate width, top bracket 73 and bottom bracket 72 can be attached together with bolt 75. The width-adjusted top bracket 72 and bottom bracket 72 are attached to a ridge 80 and a ridge 82 of a corrugated metal roof 81 using self-tapping screws 83 and self ta-tapping screws 84. Then universal width-adjustable bracket 70 provides a platform for solar installation, for snow guard installation or for other applications.

Figure 15:
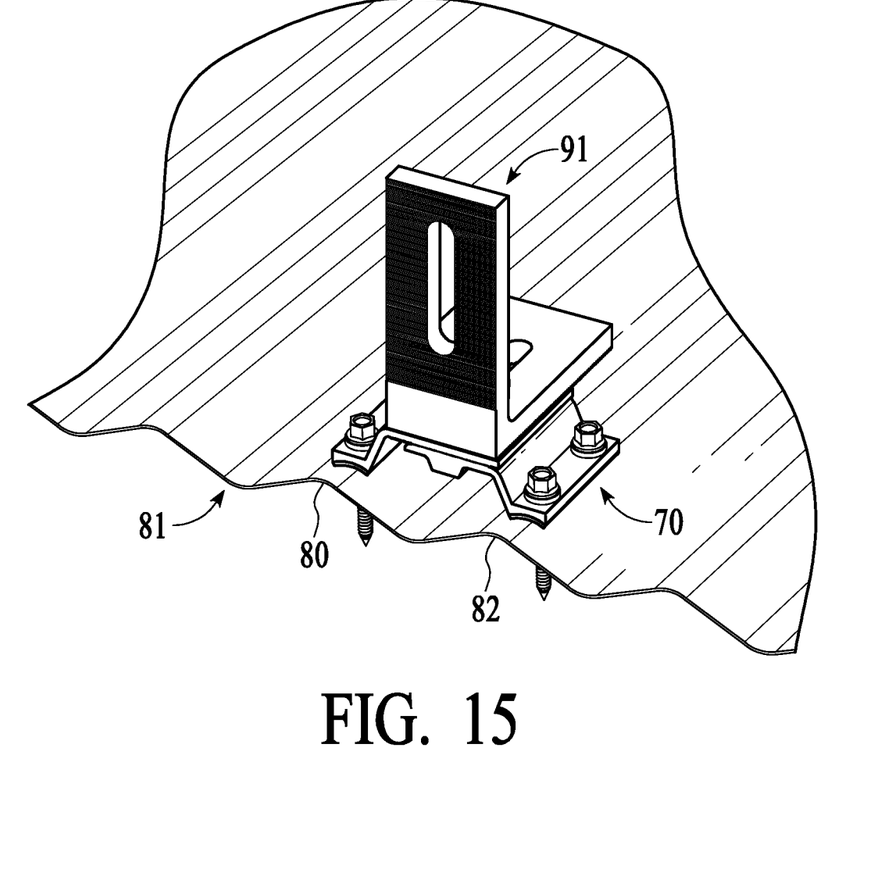
FIG. 15 is a perspective view of a universal width-adjustable bracket with an L bracket for a corrugated metal roof on a corrugated metal roof after assembly.

FIG. 15 shows universal width-adjustable bracket 70 with an L bracket 91 on corrugated metal roof 81. For example, L bracket 91 can be attached to universal width-adjustable bracket 70 using bolt 75 (shown in FIG. 14). L bracket 91 can be attached to rails for a solar mounting system, for a snow guard or for other applications.

As can be seen various embodiments of the angle-adjustable brackets can be used as a universal bracket for an R-panel trapezoidal metal roof or for corrugated metal roof. Separate adjustable left and right brackets can be rotated to adjust angle and/or can slide to provide a width adjustment. Such angle-adjustable and/or width-adjustable universal brackets fit most of R-panel trapezoidal or corrugated metal roofs, simplify solar installation procedure and reduce solar installation time and cost. This allows a solar mounting system, a snow guard or other applications to be installed on most of types of corrugated and R-panel trapezoidal metal roofs with only three universal brackets. This reduces the need to verify and source different types or sizes of brackets for different R-panel trapezoidal or corrugated metal roofs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A width adjustable bracket for a corrugated metal roof, where corrugated metal roof has a first ridge, a second ridge and a valley between the first ridge and the second ridge, the width adjustable bracket comprising:
   a bolt;
   a top bracket having:
      a flat surface with a slot for receiving the bolt, the flat surface being sized to receive an L bracket, and
      a first foot that is slightly curved to conform to a curve of the first ridge of the corrugated metal roof; and
   a bottom bracket having
      a flat portion with a bolt hole for receiving the bolt, and
      a second foot that is slightly curved to conform to a curve of the second ridge of the corrugated metal roof so that the width adjustable bracket spans across the valley between the first ridge and the second ridge;

wherein the width adjustable bracket is assembled by placing the bolt though the slot of the top bracket and the bolt being secured to the bolt hole of the bottom bracket; and wherein once the bolt is placed through the top bracket, and placed in the bolt hole of the bottom bracket, the slot in the top bracket allows adjustment of a width of the width adjustable bracket until the bolt is tightened into the bolt hole of the bottom bracket.

2. A width adjustable bracket as in claim 1:
wherein
  the first foot includes holes sized to receive self-tapping screws that secure the top bracket to the first ridge of the corrugated metal roof; and
  wherein the second foot includes holes sized to receive self-tapping screws that secure the bottom bracket to the second ridge of the corrugated metal roof.

3. A width adjustable bracket as in claim 1:
wherein
  the first foot includes holes sized to receive self-tapping screws that secure the top bracket to a peak of the first ridge of the corrugated metal roof; and
  wherein the second foot includes holes sized to receive self-tapping screws that secure the bottom bracket to a peak of the second ridge of the corrugated metal roof.

\* \* \* \* \*